Fig.1

March 19, 1957     P. G. BRUNDELL ET AL     2,785,715
ARRANGEMENT FOR FEEDING FORWARD OF LOGS AND THE LIKE
Filed Sept. 8, 1953     6 Sheets-Sheet 6

Inventors
P. G. Brundell
K. E. A. Jonsson

2,785,715

ARRANGEMENT FOR FEEDING FORWARD OF LOGS AND THE LIKE

Per Gunnar Brundell, Gavle, and Karl-Erik Arnold Jonsson, Borlange, Sweden, assignors to Soderhamns Verkstaders Aktiebolag, Soderhamn, Sweden Application September 8, 1953, Serial No. 378,738

Claims priority, application Sweden September 24, 1952

11 Claims. (Cl. 144—247)

The development concerning mechanical devices for barking of timber for sawmills and wood-pulp industries has during the recent years been directed to debarking machines of the so-called hollow head type. These machines are characterized by the feature that the timber, without any noticeable turning on its axis is fed forward one log after another in a straight path while a plurality of barking tools arranged in a rotatable holder surrounding the log, are elastically pressed against the log with such a force that the bark is removed by shearing or scraping action along helical paths. The barking tools thus slide on the wood surface and shear or scrape off the bark in advance of themselves in a tangential direction. The feeding forward of the timber is generally effected by cooperating rollers having protruding spikes and which rollers are arranged in pairs. On each side of the rotatable holder there are two such pairs of which at least one pair has driven rollers. The other pair of rollers functioning as a guiding means for the logs. The proper functioning of the feed mechanism is of great importance in connection with efficacious barking and proper servicing of said machines. By the friction against the wood surface and the producing of required pressure against length sections of the bark for overcoming of the shearing strength in the transverse direction of the log of the cambium layer between the bark and the wood, the barking tools will bring about comparatively great turning forces on the treated timber. These forces can be considered to be represented by a resultant which in a tangential direction begins from a place on the log surface which has just been barked. The magnitude of this resultant is, by generally used width of the tool, within the interval of 100 to 1500 kg. f. The lower limit is valid for timber which has been stored for a long time in water, the upper limit for thick, hard frozen bark. This tangential force is of the same magnitude as the force required for forward feeding in the axial direction and which force has to be applied by the feed mechanism.

A very important demand on the feed mechanism is that it shall guide the logs in the center of the barking machine so that the same, as closely as possible, coincide with the axis of rotation of the rotatable tool holder. Further it is desired that the feed mechanism shall be able to effectively feed forward and guide logs of very varying diameters, for instance from 1" to 16", at the same time as the feed mechanism should be able to open automatically to take care of these extremes as to timber dimensions, either the logs are fed end against end or with intermediate space. For many timber producers it is an important demand on the barking machine, and thereby also on the feed mechanism, that it shall be able to effectively handle one-metre length wood even if it is knotty or crooked.

It is previously known, for instance by the U. S. Patent 1,943,649 to arrange on barking machines in one and the same plane at right angles to the feed direction, three guide or feed rollers which are pressed in a radial direction against the log in straight paths with an angle of 120° to each other. These rollers are positively guided so that they always are located at the same distance from the main shaft of the machine. These feed devices provide a very good guiding of the log but they have not presented such advantages over the more simple feed apparatus including positively guided pairs of rollers that they have come into commercial use. As with rollers arranged in pairs, these triangularly arranged guide rollers present the serious disadvantage that they are ineffective to grasp small diameter logs unless the width of the rollers is so small that they are not suitable for feeding forward larger logs.

Accordingly the present invention has for an object to provide a feeding arrangement for moving logs axially of their length which comprises one or more feed mechanisms arranged one behind another in the feeding path of the logs, each mechanism consisting of three driven or freely running rollers arranged in the same plane at right angles to the feeding direction, and characterized thereby that the three rollers are rotatably fixed on arms, swingable substantially in a plane at right angles to the feeding direction and with the rotational axes of the rollers parallel with this plane, whereby the arms are journaled at the corners of an imaginary, preferably equilateral triangle, the center of which coincides with the center line of the feeding path of the logs. Further, according to the invention, the turning moment applied to a log during the barking by the tools rotating about the same can be utilized to wholly or partly produce the required force for setting the rollers against the log.

Figure 1:
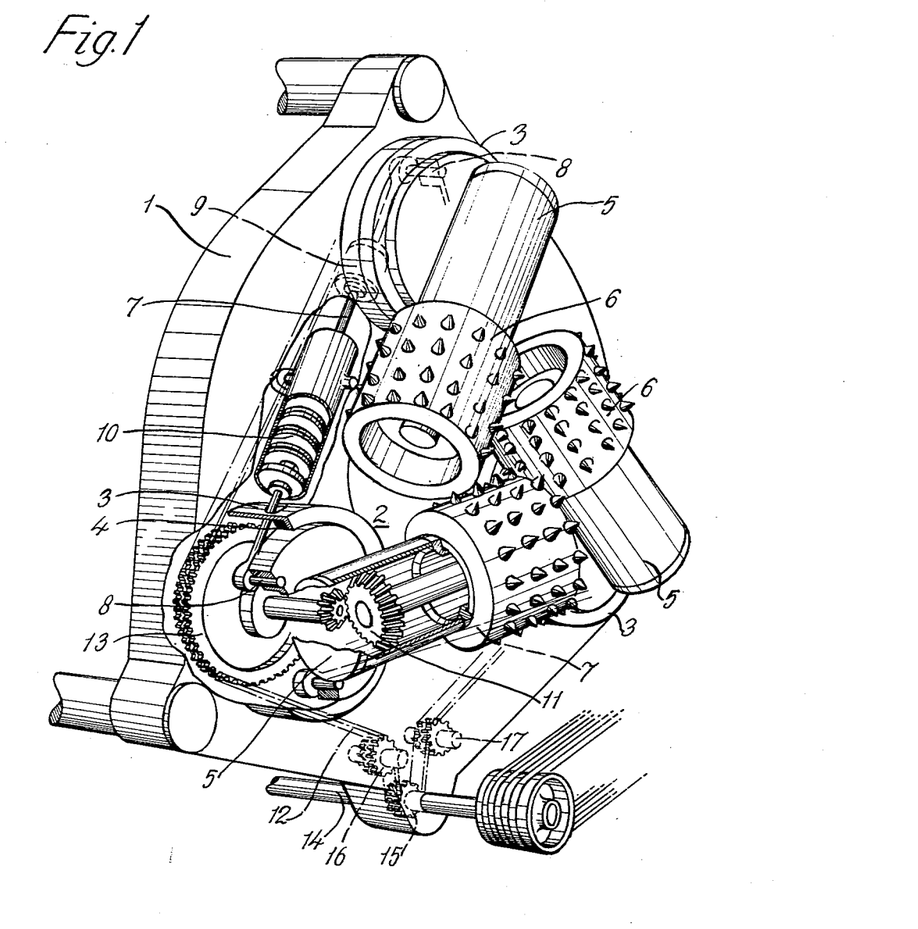

Fig. 1 illustrates an advantageous construction of a feed mechanism according to the invention. The construction includes a hollow stand 1, the outer contour of which is substantially that of an equilateral triangle having rounded corners. In the center of the stand is an aperture 2, through which the feed logs pass. Preferably the diameter of this aperture should be equal to the largest log diameter for which the barking machine is intended. In each corner 3 of an imaginary equilateral triangle on the front side of the stand 1 are provided guide faces for a ball bearing 4 of the so-called four points type. In these bearings, which constitute pivot means, are mounted three substantially equal-length arms each including inner and outer portions. The pivot means are at the inner portions of the arms and at the outer portions of the arms are rotatably mounted roller means 6. The arms and thus the rollers can swing in planes perpendicular to the line of feed of the logs and toward and away from the center line of the aperture 2. The three arms are positively guided with respect to each other, for instance as illustrated in Fig. 1 by means of connecting means including the rods 7. These are by means of pivots 8 fixed to the arms, whereby the pivots 8 are so provided in relation to the turning centers 3 of the arms that said rods act as levers. The rods 7 ensure that the respective rollers are always maintained equispaced from the center line of the machine. In other words, there are provided means linking the arms together so that any swinging movement of one arm about its pivot means is transmitted to the other two arms in substantially the same degree. In order to obtain an effective grasp by all three rollers, even on very irregular logs, it is suitable to give each arm a certain individual freedom of movement for instance by a spring device or as illustrated in the figure by means of an intermediate piece of rubber 9. The setting of the rollers against the timber is effected by the disc-spring packet 10. These disc-springs may in certain cases preferably be replaced by hydraulic operating cylinders. The synchronizing of the movement of the three rollers then may, if desired, be made on a pure hydraulic way by means of supplying equal pressure to each of the cylinders.

The driving of the rollers 6 is produced, where such driving is desired, by means of a bevel wheel gear 11. The drive of the gear 11 is in its turn produced by aid of a chain 12 guided in the hollow stand and passing over chain wheels 13 which are coupled with the small gear of the bevel gear drive. The drive of the chain is produced from the shaft 14 which includes a driveable end protruding from the stand. On shaft 15 and within the casing or stand 1 there is splined a gear 15 returning the chain. A sufficient enclosing angle on this chain wheel is obtained by means of the tension wheels 16 and 17. The bevel wheel gear is journaled in a ball bearing and a roller bearing. By forming the supporting parts of the feed mechanism, the stand and arms as shells, all the movable members, that is, shafts, bevel wheel gears, chain, chain wheels, synchronizing devices and setting devices (springs, hydraulic cylinders) can be effectively protected against mechanical damage and dirt and at the same time means for effecting spray lubrication of the above mentioned components can be readily included. Bulky, specially mounted covers are no longer required and the feed mechanism will be particularly compact.

In order to prevent dirt and water entering and oil escaping packings are provided at the free end of the feed-roller shafts and at the bearings 4 of the swingable arms.

The shaft 14 is preferably common for several feed mechanisms and via a variation device connected with the supporting rotatable holder of the barking tools. By the variation device a suitable pitch adapted to the conditions is adjusted, i. e. the distance the log is fed forward while the tool holder rotates one turn. If the speed of rotation of the holder is varied the pitch is not changed as by separate drive but is constantly equal to the adjusted value.

By placing the rollers as illustrated in Fig. 1 it is possible to arrange the feed rollers to be self-pressing with barking machines which bring about turning forces to the log. If the log tends to turn itself in direction along the roller towards the turning point 3 of the swingable arm the reaction force in the roller will pass in opposite direction along the generatrix on the cylindrical part of the roller which is tangent to the surface of the log. For maintaining equilibrium, a force is formed at right angles to the axis of rotation of the roller and which force acts at the contact area between roller and log and the magnitude of which is such that the moment of the reaction force with respect to the turning center 3 of the arm is counter-balanced. When rollers provided with spikes are used this self-pressing under the influence of the rotatable barking tools is more than sufficient to prevent the log turning itself on the rollers. There is, however, preferably such a spring stress that the whole weight of the log or a part thereof can be carried by the lowest roller. Even if in most cases it is preferable to utilize this self-pressing the magnitude of which automatically and immediately adapts itself to the turning moment on the log, it is possible to compensate for a failure of the self-pressing by means of an increased spring or piston force.

Figure 2:
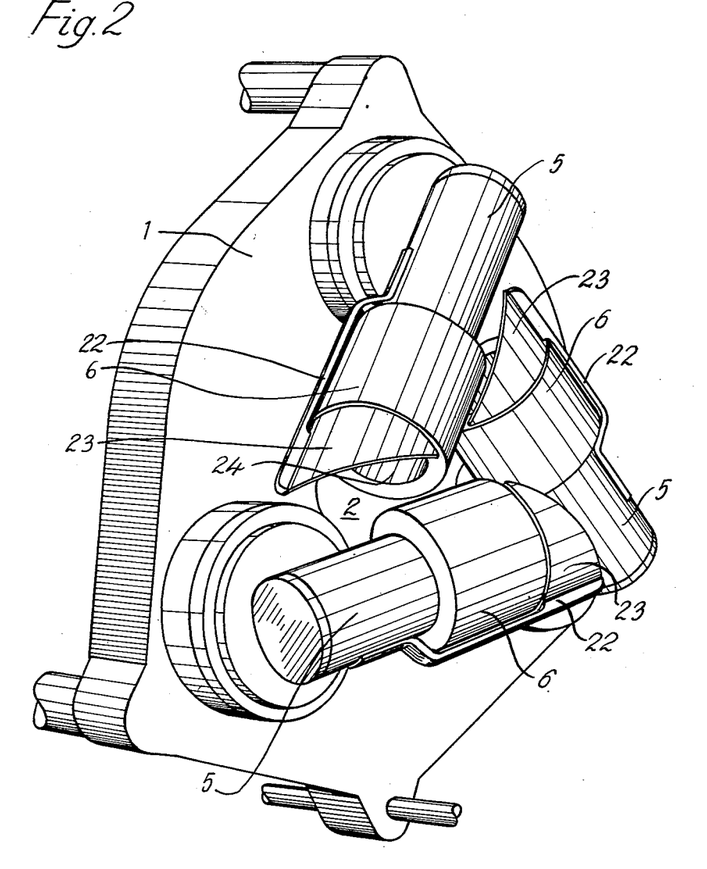

In front of the feed mechanism proper on the barking machine of the hollow head type there are provided conveyers (entering devices) generally in shape of tables with driven double-conical rollers which convey the logs forward until they are grasped by the feed rollers. In order to prevent, by such roller tables which give less good centering of the logs, small logs passing in at the side of the rollers there is arranged at each roller in a manner illustrated in Fig. 2 a shield 23 connected with the swingable arm 5 by means of a holder 22, which shield preferably is formed as an extension of the cylindrical surface of the roller. This shield device, which fills up the open sectors 24 in the central hole 2 when the rollers are in their innermost position, can be provided if the feed mechanism is combined with centering entering devices of a type suggested by the inventors. In the event that it is desired to have small logs automatically conveyed forward with a higher speed than large logs the feed rollers 6 are made conical instead of cylindrical. In that case there is no difficulty in obtaining a feeding speed for logs of 2" log diameter is twice the speed imparted to logs as large as 15" log diameter.

Figure 3:
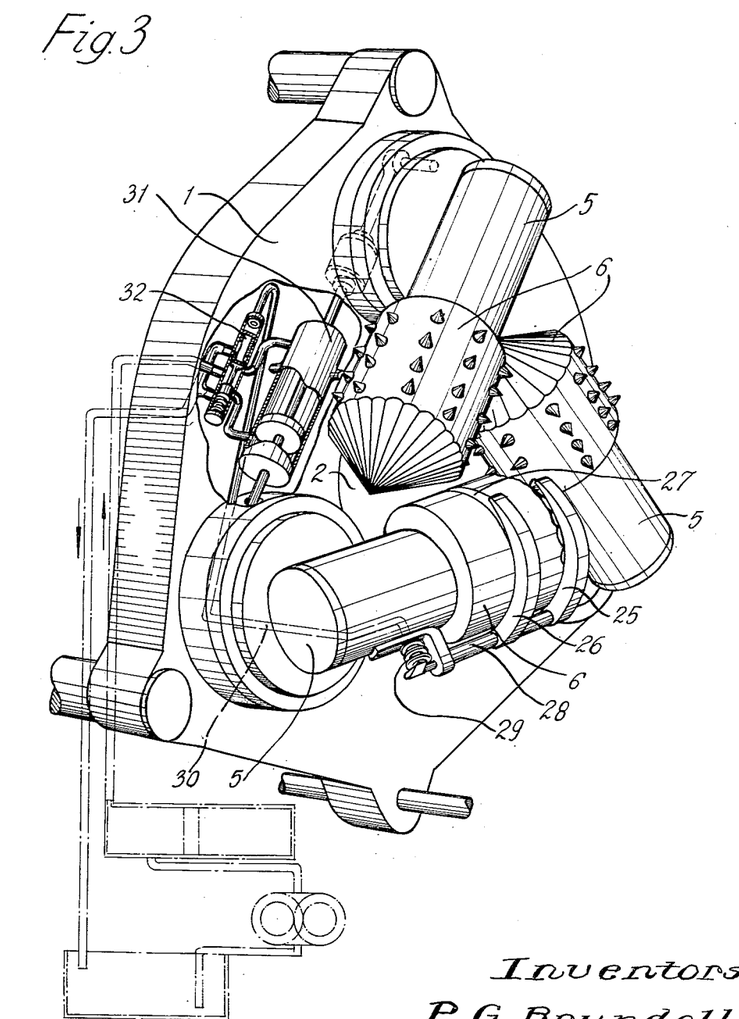

When a new log is conveyed forward towards a triangle feed mechanism according to the invention, the rollers, especially if they are provided with spikes, will easily climb up on the log and grasp the same. However, at a comparatively small roller diameter, high setting pressure and large logs, particularly if they are run with the larger end in front of same, in order to facilitate an automatic opening of the rollers, one or more of the swingable arms 5, is as illustrated in Fig. 3 provided with a feeler member 25. This feeler member can consist of a so-called flag or as shown in the figure of two ribs. These are curved in about the same radius as the roller. One of the ribs 25 is placed just outside the free end of the roller and is intended to be actuated by smaller logs. The other rib 26 is located in a circular groove 27 in the roller and so deeply that the lifting work of the roller proper when the rib is pressed in is not hampered. The two ribs constituting the flag can be turned about a shaft 28 that extends parallel with the roller axis and is supported on the swingable arm. The feeler members are held out from the roller in the feeding direction, by means of a spring force. When a log hits the feeler member this will actuate in its turn liquid filled metal bellows 29 which are in communication either with a mechanical swinging device for the rollers or with a hydraulic setting of the rollers so that the liquid from the metal bellows flowing through conduit 30 actuates a valve device 32 in the fluid circuit of the hydraulic operating cylinder 31. The valve device reverses the pressure direction in the cylinder, whereby the rollers rapidly open a distance such that the log will become free from the feeler ribs. Thereby the initial pressure direction will be restored immediately and the rollers will grasp the log and feed it into the machine. The free ends of the feeler ribs must not necessarily go down to the same height as the part of the roller facing the main shaft of the machine but there is a kept distance from this corresponding to half the diameter difference, for instance 4", that the rollers themselves with full setting pressure can handle when a smaller log end to end is followed by a larger. This opening device is of special advantage when large timber, one log after another, is conveyed forward to the machine as by barking of timber in connection with conveying it into a sawmill. Due to that the feeler member follows the arm the reversing of the pressure direction of the pistons depends at feeding of logs end to end only upon the diameter difference and not upon the absolute size of the diameter as being the case with fixed feeler members. Further the rollers do not go further than just required. At continuous feeding due to these reasons the opening manoeuvre frequence will be low and the oil consumption for each such manoeuvre small. With spring actuated swingable arms an arrangement similar to the above described can be used to relieve the setting in a hydraulic manner and to swing out the arms.

In hitherto used feed devices for barking machines of the hollow head type metal rollers have been used on the surface of which spikes, points or rifles have been provided. When the roller is pressed against the log these spikes, points or rifles will be pressed into the bark on the front side of the rotatable tool holder, possibly also into the wood on the rear side of the holder directly into the uncovered wood surface. Hereby always will arise a characteristic series of more or less deep marks in the wood. In these marks there is collected dirt at storing and in their bottom there is often from the beginning pressed-in bark particles. If the rollers on the front side of the machine make marks right down into the wood these marks will become initial points from which the barking tools can bring about considerable cracking of the outermost year ring. With certain kinds of wood that is to be converted into wood pulp, for instance sulphite wood, and particularly with wood to be converted into veneer any damage occasioned by the barking machine upon the wood surface should be decreased to a minimum.

Quite contrary to the opinion of experienced experts the inventors have succeeded, with machines of the hollow head type in bringing about feeding forward of the timber and preventing injurious turning of the same, by means of rollers, the surface of which is covered by a material softer than wood and bark, preferentially an elastomer. Such a material that has proved to be preferable is rubber of the type, which is used in solid truck wheels. By setting the rollers with a high pressure, especially in combination with self-pressing, it has proved to be possible by using entirely smooth rubber rollers to bring about sufficient feeding force and resistance against turning even for slippery, water stored timber and green timber where the rollers only on the rear side of the machine hold the wet just uncovered wood surface at barking of the larger end of the log. As an example it may be mentioned that a roller group, intended for maximum 16" log dimension, with three smooth rubber rollers which were pressed against the surface of a wet, previously barked 6½" log of spruce with a total force of 500 kgs., didn't start to slide against the rollers before a turning force, the resultant of which in the tangent plane of the log surface amounted to about 200 kgs., was applied. Hereby, the turning moment acted in such a direction that self-pressing was obtained. When the turning moment was reversed the sliding started already at somewhat over 100 kgs. Generally it is preferable to operate with a considerably higher setting pressure, for instance 1000 kgs. The effect of spikes, points and rifles is based on that these penetrate into the wood more or less and that the resistance of the wood is so great that the forces transmitted by the spikes can not notably displace the spikes in relation to the wood either in the transverse or length direction of the wood. When the log is exposed to disproportionate great turning forces, as when the tools catch in deep root holds or when the log is braked by some obstacle with the feed mechanism engaged, the spikes etc. easily overcome the resistance of the wood; the result will be serious damages in shape of deep grooves all around the log and in its length direction respectively.

Rollers of soft material, for instance rubber, base their effect not on penetration into wood or bark but on friction against the surface of the wood or bark. Any marks in the wood surface will not arise either at feeding forward or if the log would rotate in the rollers or become braked in the feeding direction. A further advantage by using rollers of elastic material is that they keep clean from layers of bark and ice. When using rollers provided with spikes or points it is necessary to provide for cleaners of the grooves. Particularly preferable in these respects are smooth rollers but patterned rollers may also be used. Covering of the rollers by elastic material is further of use for the construction of the machine as a whole due to the fact that the elastic material acts effectively damping the violent blows to which the log some times is exposed. The elastic covering further aids to the adaptation to the real form of the logs which also is brought about by the individual movements of the rollers in relation to each other. As elastic material preferably vulcanized rubber is used, but synthetic elastomer with properties specially composed for this purpose may also be used. Rollers with covering of elastic material are preferably provided with a feeler member manoeuvred opening for climbing of greater differences in diameter. Opening by means of such feeler members as above described can also be used on rollers of conventional type arranged in pairs. Such rollers arranged in pairs can be covered by an elastic material while attaining the above described technical effect. Cylindrical, elastic rollers arranged in a triangle according to the invention, however, give a much better guiding, centering and feeding forward than what is possible without other limitations to attain with rollers arranged in pairs. The fixing of the log in the axial direction of the rollers is with these rollers arranged in pairs always a problem, while triangularly arranged rollers, even if they are smooth, will keep the log positively guided close to the main shaft of the machine. In such cases when rollers provided with spikes can be accepted it is preferable to make the spikes with a size successively increasing from the end of the roller. Hereby the small logs will automatically be grasped by small spikes while the large logs will get in touch with large spikes. The cracks otherwise arising in small logs due to too large spikes are hereby avoided at the same time as the large logs are grasped by a spike size suited to their size.

Figure 4:
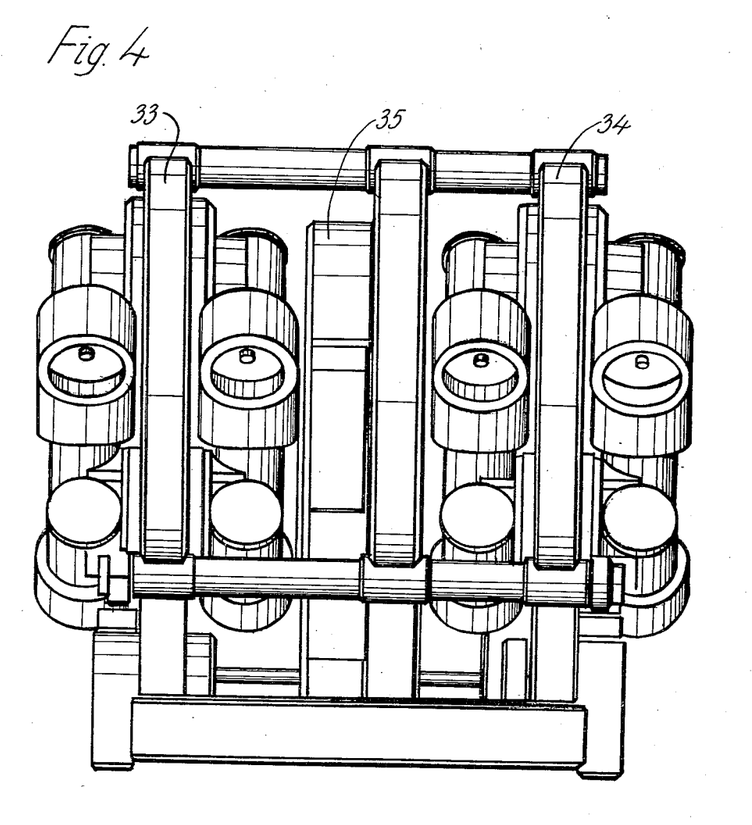

Feed mechanism made according to the invention can be combined in several different ways. In Fig. 4 is illustrated a combination which is particularly suitable for feeding of specially short wood. In the stands 33 and 34 on the front and back side respectively of the rotatable tool holder 35 are arranged two groups of three feed rollers in each group. All movable members are mounted in these stands whereby the drive of the bevel wheel gears is common for all these gears mounted in the stand. It is quite possible to build a machine with a maximum passage of 16", where wood of 1 metre length always is in a sure grasp by two roller groups without the roller diameter having to be made less than 250 mm. It is not necessary that all groups have to be driven, but on the other side driving will bring about that the rollers can open more easily at great variations in log dimensions without feeler members having to be provided in each group. Generally only the first group of rollers in the feeding direction is provided with feeler members and shield device.

Figure 5:
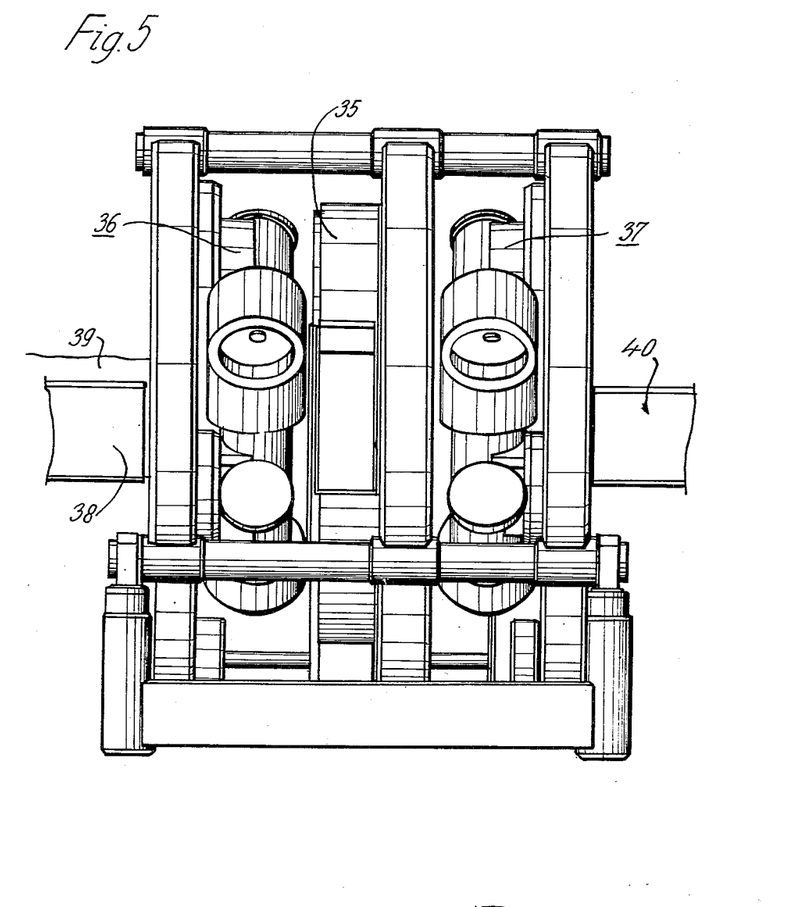

A combination which is particularly suited for sawtimber is illustrated in Fig. 5. On each side of the rotatable tool holder 35 there is a group of feed rollers 36, 37, each having three rollers. In front of the feed mechanism 36 there is on the fore side a device 38 for conveying in the logs, in the shape of a gutter, a roller table or the like, which preferably will adjust the log 39 so that its main axis as closely as possible will coincide with the axis of the barking machine. The device for conveying in the logs shall also convey logs to the first group of feed rollers until the log will become grasped by the rollers by which it is fed into the machine while preventing any noteworthy turning. Behind the group 37 of feed rollers on the feeding out side is provided a receiving device 40 consisting of a gutter, a roller table or the like which as the device for conveying in the logs shall guide the logs properly and prevent the same from rotating during the time they are held by one group of rollers only. Other combinations of triangle feed mechanism can evidently be considered as well as preferable combinations between triangle feed mechanism and ordinary feed apparatus with guide- and feed rollers arranged in pairs.

Figure 6:
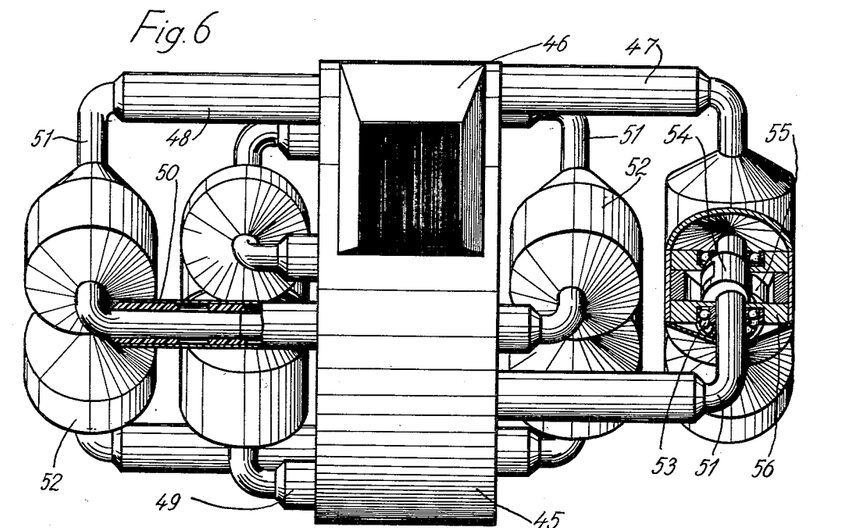
Figure 7:
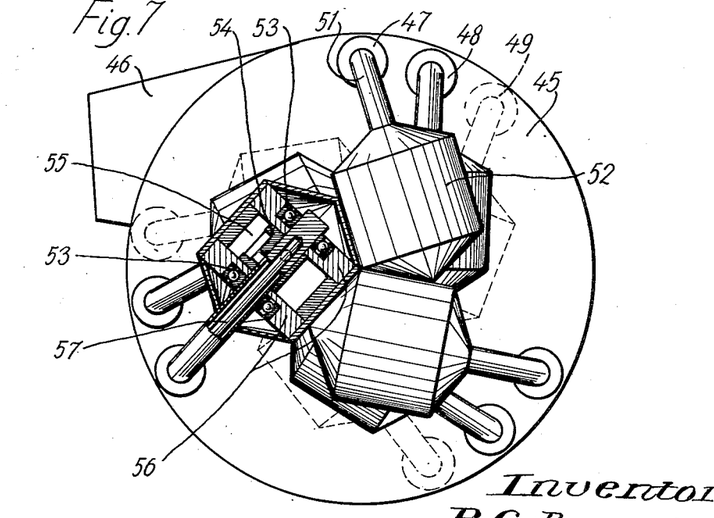

Figures 6 and 7 show an extremely compact and lightweight embodiment of the invention that is especially well suited for the rough handling that occurs to portable debarkers.

The short cylinder 45 houses debarking tools carried by a revolving hollow head (drive of which is not shown) through which the logs are fed. The bark is expelled from the cylinder through the outlet 46 by fanning action of the hollow head.

Just inside the periphery of the housing 45 (and just outside the revolving hollow head) are holes for three groups of parallel tubes, each group comprising three tubes 47, 48, 49 of different lengths and longitudinal arrangements as seen in Fig. 6. These tubes are provided with torsional rubber springs 50 which serve both as a bearing for the pivotal movement of the L-shaped arms 51 carrying the 12 feed rolls 52 as well as providing enough torque for pressing the feed rolls against the log with desired force. The operational advantages of this arrangement are readily seen: no bearing to lubricate and seal, insusceptibility to water, dirt, mechanical shock and misalignment. The compactness and lightness of this design has already been stressed.

The feed rolls, all of them or a suitable number, are driven hydraulically as shown in the roll sectioned in Fig. 7. The roll body is cast e. g. in ductile iron with suitable teeth on the log engaging surface and it is journaled in two bearings 53 at the end of the L-shaped arm 51. The inside of the roll is shaped as a carefully machined housing of an inverted sliding or tilting vane hydraulic motor where the housing i. e. the feed roll, revolves and the shaft carrying the eccentric member 54 of the motor is stationary and identical with the end of the L-shaped arm 51. The vanes 55 are mounted between closely fitted end plates 56 in which the bearings are seated. One of these end plates is provided with inlet and discharge ports for the hydraulic fluid. The inlet port is connected with a pump (not shown) through a comparatively narrow conduit 57 inside the hollow arm 51. The space left in the hollow arm carries the hydraulic fluid back to the pump from the discharge port. The returning oil from the different rolls is collected in an annular space inside the housing 45 and returned to the pump.

With these or similar simple motors, using the bearings and housing (roll) that has to be provided anyway, it is possible to produce the maximum required torque inside a roll with 8" outside diameter without employing more pressure than ordinarily is done in hydraulic circuits of this kind. It is easy to see that the speed of the rolls can be regulated in a plurality of ways.

Instead of 12 rolls as shown in the figures it may sometimes be of advantage to use only 6. This is the case e. g. when the whole structure comprising barking machine proper and feed rolls is movable up and down in a vertical guide device in which this structure is automatically or manually adjusted so that the axis of rotation of the hollow head approximately coincides with the center line of the different (but comparatively long) logs being fed to said structure on a fixed bed of chains or rollers.

By having the feed rolls fastened on the barking machine in the way outlined above the torque transmitted to the log by the debarking tools is immediately absorbed by the feed rolls and consequently there is no resulting torque to turn the log. Thus the structure comprising barking machine and feed rolls can be accommodated in ordinary chain hauls for long logs without providing these with any extra means for restraining rotation of the logs. The speed of the feed rolls is regulated, preferably automatically, to correspond to the linear feed speed of the log haul.

Synchronizing of the pivotal movement of each group of three feed rolls in Figures 6 and 7 can be accomplished in a plurality of ways, the simplest being a linking device or a thin steel strip fastened around the horizontal part of the L-shaped arms 51. By employing a rather steep spring rate in the torsional springs 50 the synchronizing device can be dispensed with. The springs carrying the weight of the logs are preferably given higher spring rates than the rest of the springs. The technical advantages which are offered by our invention can be summarized as follows:

A feed mechanism built according to the invention is able to extraordinarily effectively feed forward, guide and center long as well as short logs, even one metre wood, large as well as small logs, for instance from 16" maximum to ¾" minimum, without the roller width having to be chosen so small that it will become impractical at large log diameters. Instead of that the roller will be proportionately wide and is utilized over its whole width whereby logs with different diameters do not make contact with the same part of the roller. The wear of the roller thus will not become localized to a narrow groove of the circumference but will be divided along the whole roller. The contact point of the logs on the roller is displaced in the direction towards the turning centre of the swingable arm when the log diameter increases. Therefore, if the swingable arm is set with a fairly constant turning moment the setting force of the roller against the log will increase with its diameter. The rollers open automatically in present case with an impulse from feeler members carried by the swingable arms without the roller diameter having to be made specially large. Feed mechanism according to the invention can be made as shell-construction and light, compact and encased without any special cover being required. The material in the portions of the roller which during the feeding forward come in contact with the log can in most cases be made of rubber. Besides that the machine itself thereby will be treated in a mild way the damages of the surface of the wood arising with conventional feed rollers are entirely eliminated. In machines with barking tools that tend to turn the log, it is possible, by using a feed mechanism according to the invention, to utilize this turning tendency to entirely or partly effect the setting pressure of the rollers against the log.

It is quite possible to build barking machines with triangle feed mechanism in which there are no driven rollers. The axial feeding movement required being effected, for instance, by means of a hydraulic operating cylinder means which presses on the end plane of the log. Thereby the roller groups are utilized in a manner as previously described for centering, guiding and applying resistance against turning, whereas the feeding is produced by forces, which are not transmitted to the log by the rollers.

It is therefore clear that the present invention provides apparatus for feeding logs axially of their length while restraining the same against rotation which includes a frame means that has an opening therein larger than the maximum diameter log that is to be fed. Journalling means are carried by the frame means, disposed substantially parallel to the axis of the opening and spaced around the opening at three equally-spaced points defining the corners of a equilateral triangle. There are three arm members, each having inner and outer ends with the inner ends being respectively pivoted at each journalling means so that the arms lie transverse to the opening. Roller means are mounted on the outer end of each arm and are journalled for rotation about axes transverse to the opening. Resiliently actuated linkage means are provided for normally urging all of the arms toward the axis of the opening. Each roller means includes inner and outer ends and has an axial extent and a diameter less than the transverse dimensions of the opening. Further, the distance between the outer end of each roller means and the center of the journaling means for the associated arm is less than the distance between the centers of the respective journalling means and the distance between a point on the circumference of a roller at the outer end thereof and the center of the journalling means for the associated arm is at least slightly longer than the distance from the center of each journalling means to the center of the triangle, so that varying diameter logs can be supported and guided by the roller means in substantial coincidence with the center of the opening with the log contacting surfaces of the respective roller means moving toward the centers of the respective journalling means as the diameters of the supported and guided logs increase.

What we claim is:

1. In apparatus for feeding logs axially of their length while restraining the same against rotation, three substantially equi-length arms each including inner and outer portions, pivot means mounting the inner portions of each arm for swinging movement about an axis parallel to the line of feed, means for supporting the pivot means at points on the corners of an imaginary equi-lateral triangle having a center coinciding with the center of the line of feed, roller means including inner and outer ends mounted on the outer portion of each arm, each arm being shorter than the distance between adjacent pivot means and the distance between a point on the circumference of each roller at the outer end thereof and the center of the pivot means for the associated arm being at least slightly longer than the distance from the center of the pivot means to the center of the triangle so that the rollers will engage logs to support and guide them substantially coincident with the center of the triangle, means resiliently urging the arms and thus the roller means toward the center of the line of feed and means linking the arms together so that any swinging movement of one arm about its pivot means is transmitted to the other two arms in substantially the same degree.

2. Apparatus for feeding logs axially of their length comprising a frame means having an opening therethrough of a size greater than the largest diameter log to be fed, said frame including a front face directed toward the direction of feed, journalling means carried by the front face at three equi-spaced points radially outward of the opening having their axes parallel to the axis of the opening and located at the corner of an imaginary equi-lateral triangle, the center of which coincides with the center of the opening, three arms each including a portion journalled by each journalling means, the arms including inner and outer ends with the inner end of each arm overlying the center of the associated journalling means, each arm being shorter than the straight line distance between the centers of any two adjacent journalling means, said arms lying in a plane at right angles to the axis of the opening whereby the arms can swing toward and away from the axis of the opening, a roller means journalled on the outer portion of each arm for rotation about the arms, said roller means having inner and outer ends, the distance between a point on the circumference of each roller means at the outer end thereof and the center of the journalling means for the associated arm being at least slightly longer than the distance from the center of any journalling means to the center of the triangle, so that the roller means support and guide logs with the centers substantially coincident with the center of the opening, and means for applying resilient force to the arms to normally urge them in a direction toward the center line of the opening including linkage assembly interconnecting the arms and operative to transmit force from one arm to the other when an arm is moved away from the center line of the opening whereby any angular movement of one arm produces substantially the same angular movement of the other two arms.

3. Apparatus for feeding logs as claimed in claim 2 in which the linkage assembly interconnecting the arms comprises three linkage means each having opposite end portions and means pivotally connecting one end of each linkage means to one arm and the opposite end of each linkage means to the next radially adjacent arm.

4. Apparatus for feeding logs as claimed in claim 3 and further including in each linkage means located between the pivotal connections at the opposite ends thereof a resilient means whereby each arm has a degree of movement independent of the movement of the other arms.

5. Apparatus for feeding logs as claimed in claim 2 wherein the respective arms are hollow, a shaft means connected to each roller means, supported within and extending along each arm, a bevel gear on each shaft means, a stub shaft rotatably mounted on the axis of each journalling means, a bevel gear on each stub shaft meshing with the bevel gear within each arm, and means for simultaneously driving all the stub shafts to impart log feeding rotation to the respective roller means.

6. Apparatus for feeding logs as claimed in claim 2 and means carried by at least one of the arms constituting a feeler means to engage an oncoming log of larger diameter than a preceding log and including at least one feeler member, means supporting the same for pivotal movement toward and away from the axis of the arm, means normally urging the feeler member away from the surface of the roller means on said arm into the path of travel of the log whereby said feeler member is engaged by the end of a log of larger diameter than a preceding log and moved toward the axis of the arm and means operative in response to this movement of the feeler means toward the axis of the arm for initiating outward swinging movement of the arms so that they accommodate the larger diameter log.

7. Apparatus for feeding logs as claimed in claim 6 in which the said feeler member comprises an arcuate rib, the roller on the said arm having a groove therein accommodating the rib when the latter is pressed in toward the axis of the roller means.

8. In apparatus for feeding logs axially of their length while restraining the same against rotation, frame means having an opening therein larger than the maximum diameter log to be fed, journalling means carried by the frame means and disposed substantially parallel to the axis of the opening and spaced around the opening at three equi-spaced points defining the corners of an equilateral triangle, an arm pivoted at each journalling means and lying transverse to the opening, each arm including inner and outer ends with the inner ends thereof being pivoted at the journalling means, roller means on the outer end of each arm and journalled for rotation about axes transverse to the opening, each roller means including inner and outer ends, resiliently actuated linkage means normally urging all of the arms toward the axis of the opening, said roller means having an axial extent and a diameter less than the transverse dimensions of the opening, the distance between the outer end of each roller means and the center of the journalling means for the associated arm being less than the distance between the centers of the respective journalling means, and the distance between a point on the circumference of any roller means at the outer end thereof and the center of the journalling means for the associated arm being at least slightly longer than the distance from the center of any journalling means to the center of the triangle whereby varying diameter logs can be supported and guided by the roller means in substantial coincidence with the center of the opening with log contacting surfaces of the respective roller means moving toward the centers of the respective journalling means as the diameters of the supported and guided logs increase.

9. Apparatus for feeding logs axially of their length while restraining the same against rotation, comprising frame means having an opening therein larger than the maximum diameter log to be fed, journalling means carried by the frame means and disposed substantially parallel to the axis of the opening and spaced around the opening at three equi-spaced points defining the corners of an equilateral triangle, an arm pivoted at each journalling means and lying transverse to the opening, each arm including inner and outer ends with the inner ends thereof being pivoted at the journalling means, driven roller means on the outer end of each arm and journalled for rotation about axes transverse to the opening, each roller means including inner and outer ends, resiliently actuated linkage means normally urging all of the arms toward the axis of the opening, said roller means having an axial extent and a diameter less than the transverse dimensions of the opening, the distance between the outer end of each roller means and the center of the journalling means for the associated arm being less than the distance between the centers of the respective journalling means, and the distance between a point on the circumference of any roller means at the outer end thereof and the center of the journalling means for the associated arm being at least slightly longer than the distance from the center of any journalling means to the center of the triangle whereby varying diameter logs can be supported and guided by the roller means in substantial coincidence with the center of the opening with log contacting surfaces of the respective roller means moving toward the centers of the respective journalling means as the diameters of the supported and guided logs increase.

10. Apparatus as claimed in claim 9 in which said frame means comprises a housing, a rotatable bark removing head within said housing for removing bark from a log fed through the opening in the housing, said housing including front and rear faces as regards the direction of log feed, said journalling means, arms, their associated roller means and linkage means being supported on the front face of said housing and constituting a feed works mechanism and a similar arrangement of journalling means, arms, rollers and linkage means supported on the rear face of said housing.

11. Apparatus for feeding logs axially of their length while restraining the same against rotation, comprising the combination of three equi-spaced journalling means having axes disposed parallel to a line of log feed and located so that their centers define the corners of an equilateral triangle larger than the diameter of the maximum size log to be fed, an arm journalled at each journalling means and lying transverse to the line of feed, each arm including a free end, a driven roller means on the free end of each arm for rotation about axes transverse to the line of feed, each roller means including inner and outer ends, means operatively and resiliently connected with the arms for normally urging all of the same toward the center of the triangle, the axial extent from the center of each journalling means to the outer end of each roller means being less than the distance between the centers of any two adjacent journalling means, and the distance between a point on the circumference of any roller means at the outer end thereof and the center of the journalling means for the associated arm being at least slightly longer than the distance from the center of any journalling means to the center of the triangle whereby a log moving toward the roller means will engage the arms to move them away from the center of the triangle so that logs of varying diameters are supported, guided and fed in substantial coincidence with the center of the triangle with logs of increasing diameter making contact with the rolls on surfaces thereof displaced toward the centers of the respective journalling means.

References Cited in the file of this patent

UNITED STATES PATENTS

| 940,016 | Hick | Nov. 16, 1909 |
| 1,252,894 | Fitzgerald | Jan. 8, 1918 |
| 1,937,073 | Stuve | Nov. 28, 1933 |
| 1,943,649 | White et al. | Jan. 16, 1934 |
| 2,025,337 | Camden et al. | Dec. 24, 1935 |
| 2,477,922 | Emery et al. | Aug. 2, 1949 |
| 2,581,479 | Grasham | Jan. 8, 1952 |
| 2,694,425 | Skoglund | Nov. 16, 1954 |

FOREIGN PATENTS

| 1236/88 | Great Britain | Jan. 27, 1888 |
| 19206/92 | Great Britain | Oct. 26, 1892 |
| 268,726 | Germany | Dec. 29, 1913 |
| 313,629 | Germany | July 17, 1919 |
| 659,980 | Great Britain | Oct. 31, 1951 |